(12) United States Patent
Hashizume et al.

(10) Patent No.: US 10,786,997 B2
(45) Date of Patent: Sep. 29, 2020

(54) METHOD OF CREATING PRINTED MATTER AND PRINTED MATTER

(71) Applicant: MIMAKI ENGINEERING CO., LTD., Nagano (JP)

(72) Inventors: Hironori Hashizume, Nagano (JP); Kazuki Bando, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/114,255

(22) Filed: Aug. 28, 2018

(65) Prior Publication Data

US 2019/0061367 A1     Feb. 28, 2019

(30) Foreign Application Priority Data

Aug. 30, 2017 (JP) .................. 2017-165751

(51) Int. Cl.
*B41J 2/19* (2006.01)
*B32B 37/00* (2006.01)
(Continued)

(52) U.S. Cl.
CPC ....... *B41J 2/19* (2013.01); *B32B 7/12* (2013.01); *B32B 37/003* (2013.01); *B32B 37/06* (2013.01);
(Continued)

(58) Field of Classification Search
CPC ... B32B 37/003; B32B 37/06; B32B 37/1284; B32B 38/145; B32B 7/12; B41J 11/002;
(Continued)

(56) References Cited

U.S. PATENT DOCUMENTS 5,597,436 A * 1/1997 Ooyagi .................. B21D 51/26
156/259
5,968,605 A * 10/1999 Lutz ...................... B41F 17/001
427/498
(Continued)

FOREIGN PATENT DOCUMENTS

| CN | 104736345 | 6/2015 | |
|---|---|---|---|
| EP | 3450194 A1 * | 3/2019 | ............... B41J 2/19 |
| JP | 2017113980 | 6/2017 | |

OTHER PUBLICATIONS

"Search Report of Europe Counterpart Application", dated Jan. 24, 2019, p. 1-p. 7.

(Continued)

*Primary Examiner* — Sonya M Sengupta
(74) *Attorney, Agent, or Firm* — JCIPRNET

(57) ABSTRACT

To create a printed matter having favorable image quality that can prevent air bubbles from being trapped at the time when a protective film is attached to a medium. A method of creating printed matter includes: an ink arrangement step of ejecting a photocurable ink on a printing face of a medium by an inkjet method so that an average surface roughness of the printing face is smaller than 15 μm and irradiating the photocurable ink with a light to be cured; and a laminating step of attaching the protective film to the medium by bonding an adhesive layer of the protective film to the printing face and a surface of the photocurable ink, and the protective film including the adhesive layer having a thickness equal to or larger than 18 μm and a substrate supporting the adhesive layer.

6 Claims, 5 Drawing Sheets

(51) Int. Cl.
  *B32B 37/12* (2006.01)
  *B32B 37/06* (2006.01)
  *B41M 7/00* (2006.01)
  *B32B 7/12* (2006.01)
  *C09D 11/101* (2014.01)
  *B32B 38/00* (2006.01)
  *B41J 11/00* (2006.01)
  *B41J 2/045* (2006.01)
  *C09D 11/322* (2014.01)
  *C09D 11/38* (2014.01)
  *C09D 11/32* (2014.01)

(52) U.S. Cl.
  CPC ........ *B32B 37/1284* (2013.01); *B32B 38/145* (2013.01); *B41J 2/04501* (2013.01); *B41M 7/0027* (2013.01); *B41M 7/0081* (2013.01); *B41J 11/002* (2013.01); *B41J 2202/20* (2013.01); *C09D 11/101* (2013.01); *C09D 11/32* (2013.01)

(58) Field of Classification Search
  CPC ...... B41J 2202/20; B41J 2/04501; B41J 2/19; B41M 5/5254; B41M 7/0027; B41M 7/0081; C09D 11/101; C09D 11/322; C09D 11/38
  USPC ........................................................ 156/277
  See application file for complete search history.

(56) References Cited

U.S. PATENT DOCUMENTS

| | | | |
|---|---|---|---|
| 6,248,804 B1* | 6/2001 | Lutz .................. | B41M 1/40 |
| | | | 522/14 |
| 2002/0009553 A1* | 1/2002 | Lutz .................. | B41M 1/40 |
| | | | 427/552 |
| 2004/0066441 A1* | 4/2004 | Jones ................ | B42D 25/45 |
| | | | 347/101 |
| 2010/0221476 A1 | 9/2010 | Kojima et al. | |
| 2016/0129680 A1 | 5/2016 | Ikeda et al. | |
| 2016/0318328 A1* | 11/2016 | Satou ................ | C04B 41/52 |
| 2019/0061367 A1* | 2/2019 | Hashizume ....... | B32B 37/1284 |
| 2020/0031152 A1* | 1/2020 | Nishizawa ......... | B41J 2/00 |

OTHER PUBLICATIONS

"Office Action of China Counterpart Application," with English translation thereof, dated Dec. 19, 2019, p. 1-p. 11.

* cited by examiner

|  | FIRST COMPARABLE EXAMPLE | FIRST EXAMPLE | SECOND EXAMPLE | THIRD EXAMPLE | FOURTH EXAMPLE |
|---|---|---|---|---|---|
| THICKNESS OF SUBSTRATE | 55 | 75 | 70 | 50 | 22 |
| THICKNESS OF ADHESIVE LAYER | 15 | 18 | 25 | 50 | 34 |
| RATIO OF AIR BUBBLE AREA | 20% | 3% | 12% | 3% | 3% |

FIG. 5

METHOD OF CREATING PRINTED MATTER AND PRINTED MATTER

CROSS REFERENCE TO RELATED APPLICATIONS

This application claims the priority benefit of Japanese Patent Application No. 2017-165751, filed on Aug. 30, 2017. The entirety of the above-mentioned patent application is hereby incorporated by reference herein and made a part of this specification.

TECHNICAL FIELD

The present disclosure relates to a method of creating printed matter and a printed matter.

BACKGROUND ART

To protect a printing face and an ink, a protective film may be attached to the printing face and a surface of the ink, after the ink is ejected onto the printing face of a medium by an inkjet method (for example, refer to Patent Literature 1).

Patent Literature 1: Japanese Unexamined Patent Publication No. 2017-113980

SUMMARY

In a case of attaching the protective film to a medium as described above, air bubbles may be trapped in a space between the medium and the protective film. If a large air bubble is present or a large number of air bubbles are present, an observer may perceive cloudiness when observing the printing face from above the protective film, and such air bubbles may deteriorate image quality. Thus, there is a demand for a technique for preventing air bubbles from being trapped when the medium and the protective film are attached to each other.

The present disclosure has been made in view of such a situation, and the present disclosure provides a method of creating printed matter and a printed matter that can prevent air bubbles from being trapped when the medium and the protective film are attached to each other and that can create a printed matter having favorable image quality.

The method of creating printed matter according to the present disclosure includes: an ink arrangement step of ejecting a photocurable ink onto a printing face of a medium by an inkjet method so that an average surface roughness of the printing face is smaller than 15 µm and irradiating the photocurable ink with a light to be cured; and a laminating step of attaching the protective film to the medium by bonding an adhesive layer of a protective film to the printing face and a surface of the photocurable ink, and the protective film including the adhesive layer having a thickness equal to or larger than 18 µm and a substrate supporting the adhesive layer.

The present inventors found that air bubbles can be prevented from being trapped when the protective film is attached to the medium by attaching the protective film having the adhesive layer of which has the thickness equal to or larger than 18 µm to the medium on which the photocurable ink is placed so that the average surface roughness of the printing face is smaller than 15 µm. Thus, the present disclosure includes: the ink arrangement step of arranging the photocurable ink onto the printing face of the medium by the inkjet method so that the average surface roughness of the printing face is smaller than 15 µm; and the laminating step of attaching the protective film to the medium by bonding the adhesive layer of the protective film to the printing face and the surface of the photocurable ink, and the protective film including the adhesive layer having a thickness equal to or larger than 18 µm and the substrate supporting the adhesive layer, so that air bubbles can be prevented from being trapped when the protective film is attached to the medium, and a printed matter having favorable image quality can be created. A reason for air bubbles being prevented from entering is unclear, but it is estimated that, although the adhesive layer should have a certain thickness to follow surface unevenness represented as the surface roughness, a point at which the surface unevenness and adhesive layer thickness are balanced is within a range of the numerical values described above.

In the method of creating printed matter, the laminating step may be performed while heating the medium and the protective film at a temperature equal to or higher than 40° C. and equal to or lower than 60° C. Due to this, adhesiveness of the adhesive layer to the medium is improved, so that air bubbles can more securely be prevented from being trapped when the protective film is attached to the medium.

In the method of creating printed matter, the laminating step may include attaching the protective film to the medium while the medium and the protective film are conveyed in a same direction at a conveying speed equal to or lower than 3.0 m/minute. Due to this, the adhesive layer can be securely bonded to the medium, so that air bubbles can more securely be prevented from being trapped when the protective film is attached to the medium.

A printed matter according to the present disclosure includes: a medium, having a printing face on which a photocurable ink is placed in a cured state so that an average surface roughness of the printing face is smaller than 15 µm; and a protective film, including an adhesive layer having a thickness equal to or larger than 18 µm and a substrate supporting the adhesive layer, in which the adhesive layer is attached to the medium in a state of being bonded to the printing face and a surface of the photocurable ink, wherein a ratio of air bubble area between the medium and the protective film is smaller than 13%.

According to the present disclosure, a ratio of air bubble area between the medium and the protective film is smaller than 13%, so that, when the observer observes the printing face from above the protective film with the naked eye, for example, cloudiness that the observer perceives can be reduced. Due to this, printed matter having favorable image quality can be obtained.

In the printed matter described above, the substrate of the protective film may have a thickness equal to or larger than 50 µm. Due to this, creases and the like can be prevented from being formed on the protective film, and the printing face can be securely protected.

According to the present disclosure, air bubbles can be prevented from being trapped when the protective film is attached to the medium, and the printed matter having favorable image quality can be created.

BRIEF DESCRIPTION OF THE DRAWINGS

FIG. 5 is a table illustrating a relation among a thickness of a substrate, a thickness of an adhesive layer, and a ratio of air bubble area for printed matter according to examples and a comparative example.

DESCRIPTION OF EMBODIMENTS

The following describes an embodiment of a method of creating printed matter and a printed matter according to the present disclosure based on the drawings. The present disclosure is not limited to the embodiment. Components in the following embodiment include a component that is replaceable and easily conceivable by those skilled in the art, and substantially the same component.

Figure 1:
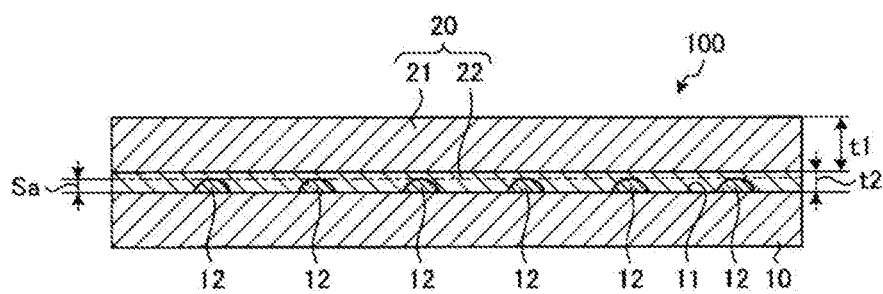
FIG. 1 is a cross-sectional view illustrating an example of a printed matter according to an embodiment.

FIG. 1 is a cross-sectional view illustrating an example of a printed matter 100 according to the present embodiment. As illustrated in FIG. 1, the printed matter 100 includes a medium 10 and a protective film 20.

The medium 10 is formed in a sheet shape using a resin material such as a vinyl chloride resin, for example. The medium 10 has a printing face 11. An ink 12 is placed on the printing face 11. The ink 12 is, for example, a photocurable ink containing a photocurable material that is cured by being irradiated with light such as ultraviolet rays. Photocurable ink including colored ink, such as white ink, cyan (C), magenta (M), yellow (Y), and black (K), and transparent ink can be appropriately used, for example, depending on a color of an image formed on the medium 10.

The ink 12 is placed on the printing face 11 so that an average surface roughness Sa is smaller than 15 μm. The average surface roughness is what is called an arithmetic mean height, which is a value obtained by averaging heights from the printing face 11 for each piece of ink 12. The ink 12 is ejected onto the printing face 11 by the inkjet method, for example. In this case, by adjusting an ejection amount of the ink ejected by the inkjet method, the height of the ink landed on the printing face 11 can be controlled. In a case of ejecting the ink 12 by the inkjet method, the ejection amount of the ink 12 is easily controlled to cause the average surface roughness Sa of the printing face 11 to be smaller than 15 μm without requiring especially difficult control.

The protective film 20 is attached to the printing face 11 of the medium 10 to protect the printing face 11. The protective film 20 includes a substrate 21 and an adhesive layer 22. The substrate 21 is formed in a sheet shape using a resin material such as a vinyl chloride resin material, for example. The substrate 21 may be formed by using the same material as that of the medium 10. Thickness t1 of the substrate 21 may be set to be equal to or larger than 50 μm, for example, but is not limited thereto. The thickness t1 may be equal to or smaller than 50 μm.

The adhesive layer 22 is supported by the substrate 21 and formed by using an acrylic resin material. The adhesive layer 22 is bonded to the printing face 11 and the surface of the ink 12. The adhesive layer 22 has elasticity to deform following the shape of the surface of the ink 12 arranged on the printing face 11 in a protruding manner. Thickness t2 of the adhesive layer 22 is set to be equal to or larger than 18 μm, for example.

The following describes a ratio of air bubble area of the printed matter 100. In a case in which an air bubble portion is present between the medium 10 and the protective film 20, when the printing face 11 is observed from above the protective film 20 with an optical microscope, luminance of the air bubble portion is higher than that in the other portion. In the present embodiment, from measurement target regions of the printed matter 100, a region having luminance higher than a predetermined threshold is extracted as an extracted region, an area ratio of the extracted region to the entire measurement target regions is calculated, and the calculation result is assumed to be the ratio of air bubble area. Thus, as a value of the ratio of air bubble area is smaller, a trapping degree of air bubbles between the medium 10 and the protective film 20 is lower.

In the printed matter 100 described above, the ratio of air bubble area is smaller than 13% in a case of observing the printing face 11 with a microscope from above the protective film 20. By causing the ratio of air bubble area to be smaller than 13%, in a case in which the observer observes the printing face 11 with the naked eye from above the protective film 20, cloudiness that the observer perceives can be reduced.

Figure 2:
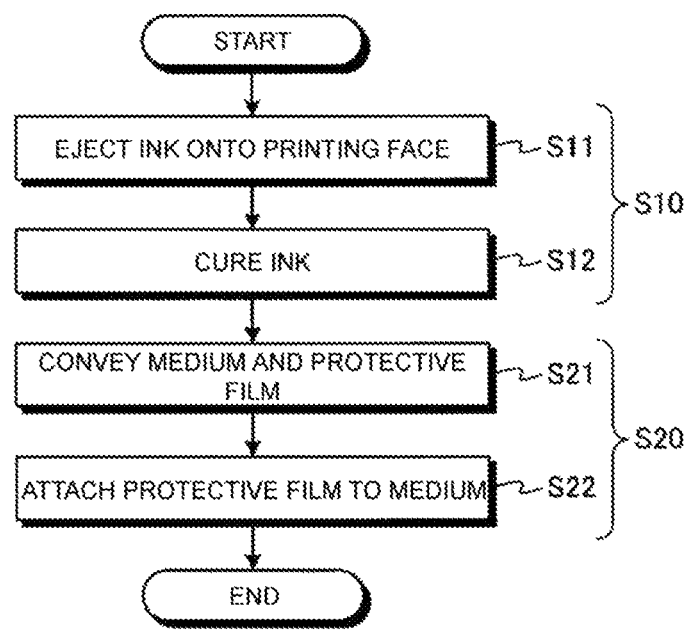
FIG. 2 is a flowchart illustrating an example of a method of creating printed matter according to the embodiment.

Next, the following describes a method of creating the printed matter 100 configured as described above (a method of creating printed matter). FIG. 2 is a flowchart illustrating an example of the method of creating printed matter according to the present embodiment. As illustrated in FIG. 2, the method of creating printed matter includes an ink arrangement step (Step S10) and a laminating step (Step S20).

Figure 3:
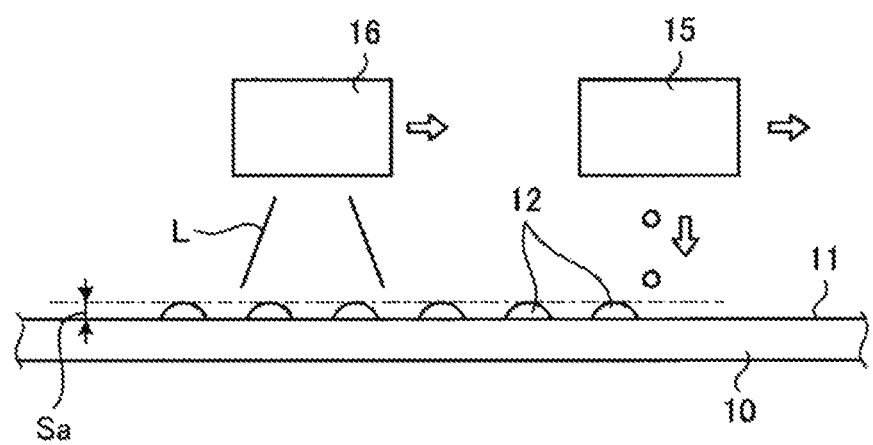
FIG. 3 is a diagram illustrating an example of an ink arrangement step in the method of creating printed matter according to the embodiment.

FIG. 3 is a diagram illustrating an example of an ink arrangement step in the method of creating printed matter according to the present embodiment. At the ink arrangement step S10, an ultraviolet curable ink 12 is ejected onto the printing face 11 from an inkjet head 15 (Step S11). At Step S11, the ink 12 is ejected while moving the inkjet head 15 in a main scanning direction, and the ejected ink 12 is caused to be landed on the printing face 11 of the medium 10. At the ink arrangement step S10, an ultraviolet irradiation device 16 is moved following a moving direction of the inkjet head 15, and ultraviolet rays L are applied from the ultraviolet irradiation device 16 to the ink 12 to be cured (Step S12).

Figure 4:
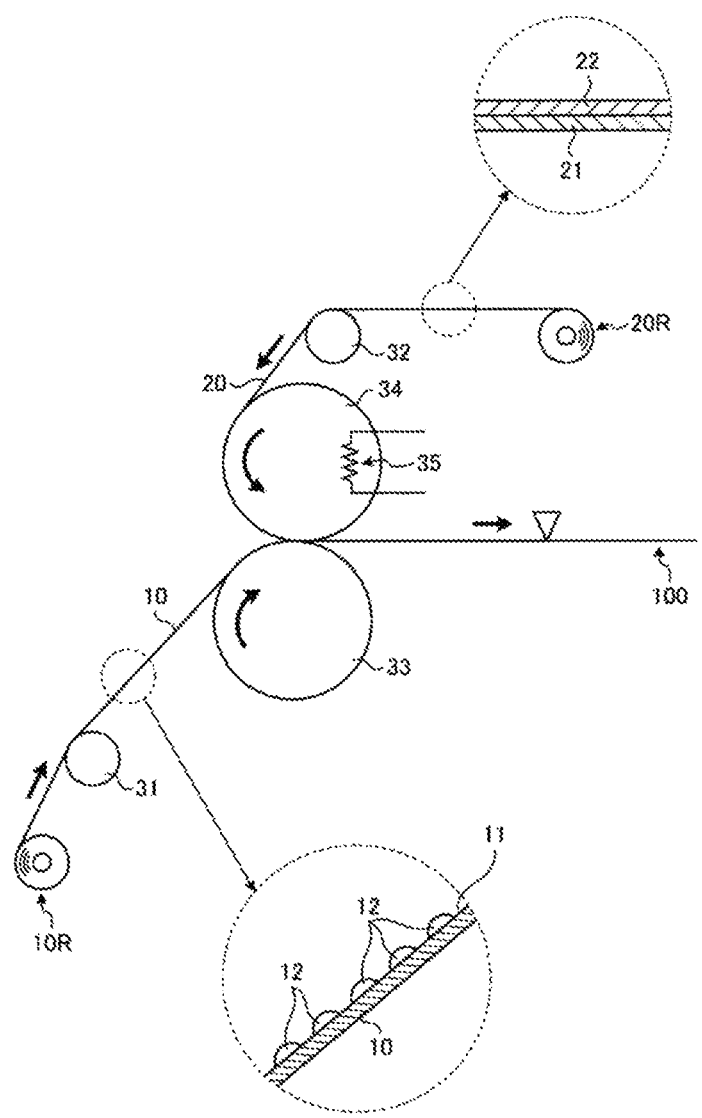
FIG. 4 is a diagram illustrating an example of a laminating step in the method of creating printed matter according to the embodiment.

FIG. 4 is a diagram illustrating an example of the laminating step in the method of creating printed matter according to the present embodiment. At the laminating step S20, first, the medium 10 on which the ink 12 is cured and the protective film 20 are conveyed (Step S21). At Step S21, as illustrated in FIG. 4, the medium 10 on which the ink 12 is cured is formed in a roll shape and mounted on a medium supplier 10R. The protective film 20 in which the adhesive layer 22 is held by the substrate 21 is formed in a roll shape and mounted on a protective film supplier 20R. From this state, one end of the medium 10 and one end of the protective film 20 are drawn out. The medium 10 is hung on a conveyance roller 31 to be sent to pinch rollers 33 and 34. The medium 10 is conveyed so that the printing face 11 is opposed to the protective film 20. The protective film 20 is hung on the conveyance roller 32 to be sent to the pinch rollers 33 and 34. The protective film 20 is conveyed so that the adhesive layer 22 is opposed to the printing face 11 of the medium 10.

At the laminating step S20, the protective film 20 is attached to the medium 10 by the pinch rollers 33 and 34 (Step S22). At Step S22, the medium 10 and the protective film 20 are pinched by the pinch rollers 33 and 34, and the adhesive layer 22 of the protective film 20 is bonded to the printing face 11 of the medium 10 and the surface of the ink 12. Due to this, the protective film 20 is attached to the medium 10.

A heating mechanism 35 is arranged in the pinch roller 34 arranged on the protective film 20 side. The heating mechanism 35 heats the pinch roller 34. Due to this, the medium 10 and the protective film 20 are heated via the pinch roller 34. In the heating mechanism 35, a heating temperature for heating the pinch roller 34 is adjusted so that the medium 10 and the protective film 20 are heated at a temperature equal to or higher than 40° C. and equal to or lower than 60° C.

The medium 10 and the protective film 20 that are pinched by the pinch rollers 33 and 34 to be attached to each other are sent out forward in the conveying direction by the pinch rollers 33 and 34. The pinch rollers 33 and 34 sends out the medium 10 and the protective film 20 so that a conveying speed of the medium 10 and the protective film 20 is equal to or lower than 3.0 m/minute. By cutting the medium 10 and the protective film 20 sent out from the pinch rollers 33 and 34 in an appropriate size, the printed matter 100 is obtained.

As described above, the method of creating printed matter according to the present embodiment includes: the ink arrangement step S10 of ejecting the photocurable ink 12 to the printing face 11 of the medium 10 by the inkjet method so that the average surface roughness is smaller than 15 µm, and irradiating the ink 12 with light to be cured; and the laminating step S20 of attaching the protective film 20 to the medium 10 by boding the adhesive layer 22 of the protective film 20 to the printing face 11 and the surface of the ink 12, the protective film 20 including the adhesive layer 22 having the thickness equal to or larger than 18 µm and the substrate 21 supporting the adhesive layer 22.

The present inventors found that air bubbles can be prevented from being trapped when the protective film 20 is attached to the medium 10 by attaching the protective film 20 in which the thickness of the adhesive layer 22 is equal to or larger than 18 µm to the medium 10 on which the ink 12 is placed so that the average surface roughness Sa of the printing face 11 is smaller than 15 µm. Thus, with the method of creating printed matter according to the present embodiment, air bubbles can be prevented from being trapped when the protective film 20 is attached to the medium 10, and the printed matter 100 having favorable image quality can be created. In the present embodiment, the ink 12 is ejected by the inkjet method, so that the average surface roughness Sa of the printing face 11 can be easily caused to be smaller than 15 µm. Thus, air bubbles can be easily prevented from being trapped by substantially adjusting a condition of the protective film 20 without strictly controlling the ejection amount and the like of the ink 12 more than necessary.

In the method of creating printed matter according to the present embodiment, the laminating step S20 may be performed while heating the medium 10 and the protective film 20 at the temperature equal to or higher than 40° C. and equal to or lower than 60° C. Due to this, adhesiveness of the adhesive layer 22 to the medium 10 is improved, so that air bubbles can more securely be prevented from being trapped when the protective film 20 is attached to the medium 10.

In the method of creating printed matter according to the present embodiment, the laminating step S20 may include attaching the protective film 20 to the medium 10 while conveying them in the same direction at the conveying speed equal to or lower than 3.0 m/minute. Due to this, the adhesive layer 22 can be securely bonded to the medium 10, so that air bubbles can more securely be prevented from being trapped when the protective film 20 is attached to the medium 10.

The printed matter 100 according to the present embodiment includes: the medium 10 having the printing face 11 on which the photocurable ink 12 is placed in a cured state so that the average surface roughness Sa is smaller than 15 µm; and the protective film 20 including the adhesive layer 22 having the thickness equal to or larger than 18 µm and the substrate 21 supporting the adhesive layer 22, in which the adhesive layer 22 is attached to the medium 10 in a state of being bonded to the printing face 11 and the surface of the ink 12, and the ratio of air bubble area between the protective film 20 and the medium 10 is smaller than 13%.

With this configuration, the ratio of air bubble area between the medium 10 and the protective film 20 is smaller than 13%, so that, in a case in which the observer observes the printing face 11 with the naked eye from above the protective film 20, for example, cloudiness that the observer perceives can be reduced. Due to this, the printed matter 100 having favorable image quality can be obtained.

In the printed matter 100 according to the present embodiment, the thickness of the substrate 21 of the protective film 20 may be equal to or larger than 50 µm. Due to this, creases and the like can be prevented from being formed on the protective film 20, and the printing face 11 can be securely protected.

The technique of the present disclosure is not limited to the embodiment described above and can be appropriately modified without departing from the gist of the present disclosure. For example, in the embodiment described above, exemplified is a case of forming the medium 10 and the protective film 20 in a roll shape to be attached to each other, but the embodiment is not limited thereto. The medium 10 and the protective film 20 may be formed in a rectangular shape, and one medium 10 and one protective film 20 may be attached to each other.

EXAMPLES

Next, the following describes examples of the present disclosure. FIG. 5 is a table illustrating a relation among the thickness of the substrate, the thickness of the adhesive layer (unit: µm), and the ratio of air bubble area (unit: %) for printed matter according to the examples and a comparative example. Herein, the printed matter 100 was formed by attaching the protective film in which the substrate and the adhesive layer both have a thickness of predetermined value to the medium (the comparative example, and first to fourth examples). The temperature at the time of attachment is assumed to be 25° in each case, and the conveying speed of the medium and the protective film is assumed to be 3.0 m/minute in each case.

As illustrated in FIG. 5, in the comparative example 1, PLS-G (manufactured by MIMAKI ENGINEERING CO., LTD.) was used as a substrate of the protective film. The thickness of the substrate (PVC, monomeric) is assumed to be 55 µm, and the thickness of the adhesive layer (acrylic) is assumed to be 15 µm. In the first example, monomeric PVC was used as the substrate of the protective film. In the first embodiment, the thickness of the substrate is assumed to be 75 µm, and the thickness of the adhesive layer (acrylic) is assumed to be 18 µm. In the second example, monomeric PVC was used as the substrate of the protective film. In the second example, the thickness of the substrate is assumed to be 70 µm, and the thickness of the adhesive layer (acrylic) is assumed to be 25 µm. In the third example, polymeric PVC was used as the substrate of the protective film. In the third example, the thickness of the substrate is assumed to be 50 µm, and the thickness of the adhesive layer (acrylic, solvent-based polyacrylic acid) is assumed to be 50 µm. In the fourth example, cast PVC was used as the substrate of the protective film. In the fourth example, the thickness of the substrate is assumed to be 22 μm, and the thickness of the adhesive layer (acrylic, permanent acrylic) is assumed to be 34 μm.

Thereafter, for a plurality of regions of the printed matter according to the comparative example and the first to fourth examples, the ratio of air bubble area was measured by microscope observation. In microscope observation, luminance of the air bubble portion becomes high. Thus, from measurement target regions of the printed matter according to the comparative example and the first to fourth examples, a region having the luminance higher than a predetermined threshold in microscope observation was extracted to be an extracted region, an area ratio of the extracted region to the entire measurement target region was calculated, and the calculation result was assumed to be the ratio of air bubble area.

As illustrated in FIG. 5, the ratio of air bubble area was 20% at the maximum in the printed matter according to the comparative example. The ratio of air bubble area was 3% at the maximum in the printed matter according to the first example. The ratio of air bubble area was 12% at the maximum in the printed matter according to the second example. The ratio of air bubble area was 3% at the maximum in the printed matter according to the third example. The ratio of air bubble area was 3% at the maximum in the printed matter according to the fourth example. In this way, the ratio of air bubble area was smaller than 13% in all the pieces of printed matter according to the first to fourth examples. Thus, the printed matter according to the first to fourth examples has reduced cloudiness, thereby having high image quality.

What is claimed is:

1. A method of creating printed matter, comprising:
    an ink arrangement step of ejecting a photocurable ink onto a printing face of a medium by an inkjet method so as to form an image having a color matching to a color tone of the photocurable ink, and irradiating the photocurable ink with a light to be cured so that an average surface roughness of the printing face is smaller than 15 μm, wherein the ink arrangement step comprises a controlling step of adjusting an ejection amount of the photocurable ink ejected by the inkjet method to cause the average surface roughness of the printing face to be smaller than 15 μm, and
    the average surface roughness is a value obtained by averaging heights of all pieces of the photocurable ink on the printing face; and
    a laminating step of attaching a protective film to the medium by bonding an adhesive layer of the protective film to a surface of the image through applying pressure, and the protective film including the adhesive layer having a thickness ranging inclusively from about 18 μm to about 50 μm and a substrate supporting the adhesive layer, and a ratio of an air bubble area between the medium and the protective film being smaller than 13%.

2. The method of creating printed matter according to claim 1, wherein
    the laminating step is performed while heating the medium and the protective film at a temperature equal to or higher than 40° C. and equal to or lower than 60° C.

3. The method of creating printed matter according to claim 1, wherein
    the laminating step includes conveying the medium and the protective film in a same direction at a conveying speed equal to or lower than 3.0 m/minute to be attached to each other.

4. The method of creating printed matter according to claim 2, wherein
    the laminating step includes conveying the medium and the protective film in a same direction at a conveying speed equal to or lower than 3.0 m/minute to be attached to each other.

5. A printed matter, comprising:
    a medium, having a printing face on which an image is provided, and a photocurable ink is placed in a cured state so as to have a color tone matching to a color of the image, so that an average surface roughness of the printing face is smaller than 15 μm, wherein the average surface roughness is a value obtained by averaging heights of all pieces of the photocurable ink on the printing face; and
    a protective film, including an adhesive layer having a thickness ranging inclusively from about 18 μm to about 50 μm and a substrate supporting the adhesive layer, in which the adhesive layer is attached to the printed matter in a state of being bonded to a surface of the image, wherein
    a ratio of an air bubble area between the medium and the protective film is smaller than 13%.

6. The printed matter according to claim 5, wherein the substrate of the protective film has a thickness equal to or larger than 50 μm.

* * * * *